(12) United States Patent
Bahng et al.

(10) Patent No.: US 8,040,980 B2
(45) Date of Patent: Oct. 18, 2011

(54) LOG LIKELIHOOD RATIO CALCULATION METHOD, TRANSMIT SIGNAL DETECTION METHOD, AND RECEIVER

(75) Inventors: Seung Jae Bahng, Daejeon (KR); Chang Wahn Yu, Daejeon (KR); Young Jo Bang, Daejeon (KR); Dae Ho Kim, Daejeon (KR); Young Ha Lee, Daejeon (KR); Youn-Ok Park, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 711 days.

(21) Appl. No.: 12/142,600

(22) Filed: Jun. 19, 2008

(65) Prior Publication Data

US 2009/0052593 A1 Feb. 26, 2009

(30) Foreign Application Priority Data

Aug. 23, 2007 (KR) .................. 10-2007-0084846

(51) Int. Cl.
*H04L 27/06* (2006.01)
*H03K 9/00* (2006.01)
*H04L 27/00* (2006.01)

(52) U.S. Cl. ........................... 375/340; 375/316
(58) Field of Classification Search .............. 375/340
See application file for complete search history.

(56) References Cited

U.S. PATENT DOCUMENTS

| 7,532,683 | B2 | 5/2009 | Koslov |
| 2005/0094615 | A1* | 5/2005 | Kim et al. ............. 370/349 |
| 2005/0157822 | A1* | 7/2005 | Khandekar et al. ...... 375/340 |
| 2007/0086541 | A1 | 4/2007 | Moon et al. |
| 2008/0170640 | A1* | 7/2008 | Gao et al. ............. 375/302 |
| 2010/0086067 | A1* | 4/2010 | Oka .................. 375/260 |

FOREIGN PATENT DOCUMENTS

| KR | 10-2006-0021312 A | 3/2006 |
| KR | 10-2006-0120255 A | 11/2006 |
| KR | 10-2007-0052037 A | 5/2007 |

OTHER PUBLICATIONS

Kawai et al., Likelihood Function for QRM-MLD Suitable for Soft-Decision Turbo Decoding and Its Performance for OFCDM MIMO Multiplexing in Multipath Fading Channel, Special Section on Multi-carrier Signal Processing Techniques for Next Generation Mobile Communications, Jan. 2005, pp. 47-57, IEICE Trans. Commun., vol. E88, No. 1.

* cited by examiner

*Primary Examiner* — David Payne
*Assistant Examiner* — Erin File
(74) *Attorney, Agent, or Firm* — Jefferson IP Law, LLP (57) ABSTRACT

The present invention relates to a log-likelihood ratio calculation method, a transmitting signal detection method, and a receiver. The present invention estimates a channel on the basis of the received signal and rearranges a plurality of layers. Further, at the time of rearrangement of the layers, a symbol of a layer having the lowest reliability is considered for every constellation dot, and the successive interference for the remaining layers is removed corresponding to the constellation dots of the layer having the lowest reliability to set the transmitting symbol candidate vector. Furthermore, a log-likelihood ratio for every bit of the plurality of layers is calculated using the transmitting symbol candidate vector to decode the channel.

14 Claims, 6 Drawing Sheets

LOG LIKELIHOOD RATIO CALCULATION METHOD, TRANSMIT SIGNAL DETECTION METHOD, AND RECEIVER

CROSS-REFERENCE TO RELATED APPLICATION

This application claims priority to and the benefit of Korean Patent Application No. 10-2007-0084846 filed in the Korean Intellectual Property Office on Aug. 23, 2007, the entire contents of which are incorporated herein by reference.

BACKGROUND OF THE INVENTION (a) Field of the Invention

The present invention relates to a log-likelihood ratio (LLR) calculation method, a transmit signal detection method, and a receiver. In particular, the present invention relates a log likelihood ratio calculation method, a transmit signal detection method, and a receiver in a multiple input multiple output (MIMO) system that uses a spatial multiplexing (SM) method.

(b) Description of the Related Art

Recently, mobile communication systems demand to transmission of data at a high speed in fixed and mobile environments. In order to satisfy this demand, an MIMO system that uses an SM method that is capable of transmitting multiple data layers is attracting attention.

The MIMO system that uses the spatial multiplexing method transmits data layers that represent different information through a multiple transmitting antenna and separates the transmitted data layer at a receiving end. In the related art, the transmitted data layers are separated by using a maximum likelihood bit metric detection method that calculates a maximum likelihood bit metric for every transmitting signal vector having combinations available for detecting the optimal transmitting signal to find a transmitting signal vector having the smallest ML metric.

However, the above ML signal detection method has optimal transmitting signal detection performance, but has very high complexity due to the exponential increase of the constellation size and the number of transmitter antennas.

SUMMARY OF THE INVENTION

The present invention has been made in an effort to provide a transmit signal detection method and a receiver with low complexity and improved transmitting signal detection performance for the multiple transmitting/receiving system that uses a spatial multiplexing method, and a log-likelihood ratio calculation method therefor.

A log-likelihood ratio calculation method of a receiver according to an exemplary embodiment of the present invention includes:

rearranging a plurality of layers; detecting a transmitting symbol candidate vector using the plurality of rearranged layers; calculating a log-likelihood ratio of a first layer among the plurality of layers and a threshold value using the transmitting symbol candidate vector; and calculating a log-likelihood ratio of at least one second layer excepting the first layer among the plurality of layers using the transmitting symbol candidate vector and the threshold value.

Further, a transmitting signal detection method of a receiver according to another embodiment of the present invention includes:

estimating a channel matrix; rearranging a plurality of layers on the basis of the norms of layers of an inverse matrix of the channel matrix; detecting a transmitting symbol candidate vector using the plurality of rearranged layers; calculating a first log-likelihood ratio of a layer having the lowest reliability among the plurality of layers and a threshold value using the transmitting symbol candidate vector; calculating a second log-likelihood ratio of the remaining layers excepting the layer having the lowest reliability among the plurality of layers using the transmitting symbol candidate vector and the threshold value; and detecting a transmitting signal on the basis of the first log-likelihood ratio and the second log-likelihood ratio.

Furthermore, a receiver according still another embodiment of the present invention includes:

a channel estimation and layer arrangement unit that estimates a channel matrix and rearranges the channel matrix and a plurality of layers; a candidate group setting unit that assigns a first layer among the plurality of layers to a plurality of constellation dots and sets a transmitting symbol candidate vector by removing successive interference of at least one second layer excepting the first layer among the plurality of layers; and a log-likelihood ratio calculator that calculates a first log-likelihood ratio corresponding to the first layer using a minimum Euclidean distance corresponding to the first layer and a threshold value, and a second log-likelihood ratio corresponding to the at least second layer using the threshold value.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "unit" or "-er" used herein means one unit that processes a specific function or operation, and may be implemented by hardware or software, or a combination thereof.

Hereinafter, a log likelihood ratio (LLR) calculation method, a transmit signal detection method, and a receiver in a multiple input multiple output (MIMO) system that uses a spatial multiplexing (SM) method according to an embodiment of the invention will be described with reference to drawings.

Figure 1:
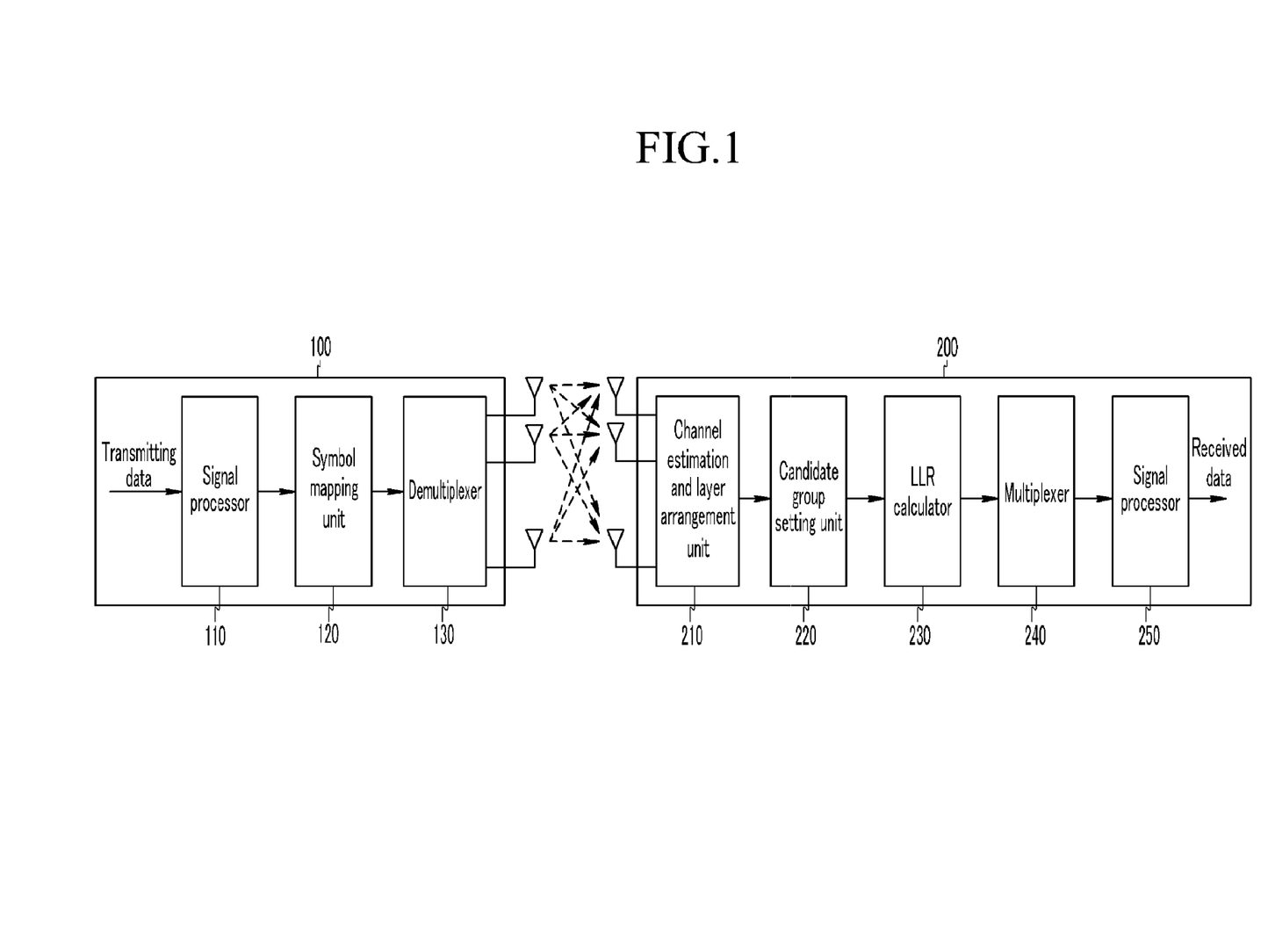
FIG. 1 is a configuration diagram showing a transmitter and a receiver according to an exemplary embodiment of the present invention.

FIG. 1 is a configuration diagram showing a transmitter 100 and a receiver 200 according to an exemplary embodiment of the present invention, and the transmitter 100 and receiver 200 are in a MIMO system.

The transmitter 100 and the receiver 200 according to the exemplary embodiment of the present invention may include a different number of transmitting/receiving antennas. However, for better comprehension and ease of description, the configuration of the transmitter and the receiver will be described with a MIMO system including the transmitter 100 that has four transmitting antennas and the receiver 200 that has four receiving antennas.

Referring to FIG. 1, the transmitter 100 includes a signal processor 110, a symbol mapping unit 120, and a demultiplexer 130.

The signal processor 110 performs signal processing such as scrambling, error correction coding, and interleaving on the transmitting data, and outputs the processed data. In this case, the transmitting data that is input to the signal processor 110 refers to binary data that is transferred from a medium access control (MAC) level to a physical level.

The symbol mapping unit 120 changes the transmitting data that is processed and output from the signal processor 110 into high speed symbols on the basis of a modulation method.

The demultiplexer 130 divides the high speed symbols that are output from the symbol mapping unit 120 into four low speed layers on the basis of the number of transmitting antennas and then outputs them, and the four output low speed layers are simultaneously transmitted through the individual transmitting antennas. Here, a layer refers to a data stream.

The receiver 200 includes a channel estimation and layer arrangement unit 210, a candidate group setting unit 220, an LLR calculator 230, a multiplexer 240, and a signal processor 250.

The channel estimation and layer arrangement unit 210 estimates the channels using a signal received through the receiving antaean, rearranges the layer and the channel, and then outputs them. According to the layer rearrangement method, a layer having the lowest reliability is arranged as the last layer, and the remaining layers are sequentially arranged from layers having lower reliability to layers having higher reliability. That is, the layer having the lowest reliability is arranged as the last layer, the layer having the highest reliability is arranged as the third layer, and the next layers are arranged as the second layer and the first layer, respectively. According to an exemplary embodiment of the present invention, the reliability of the layer is determined on the basis of a signal-to-noise ratio (SNR).

The candidate group setting unit 220 determines a transmitting symbol candidate vector using the rearranged layers and the channel received from the channel estimation and layer arrangement unit 210.

The LLR calculator 230 calculates a soft value for each bit of the plurality of layers using the transmitting symbol candidate vector determined in the candidate group setting unit 220. Here, as for the soft value, a log likelihood ratio (LLR) is used.

The multiplexer 240 and the signal processor 250 perform reverse function of the demultiplexer unit 130 and the signal processor 110 of the transmitter 100, decode the channel, and detect the transmitting signal using the soft value calculated in the LLR calculator 230.

Next, referring to FIGS. 2 to 5, a transmitting signal detection method of the receiver 200 according to an exemplary embodiment of the present invention will be described in detail.

Figure 2:
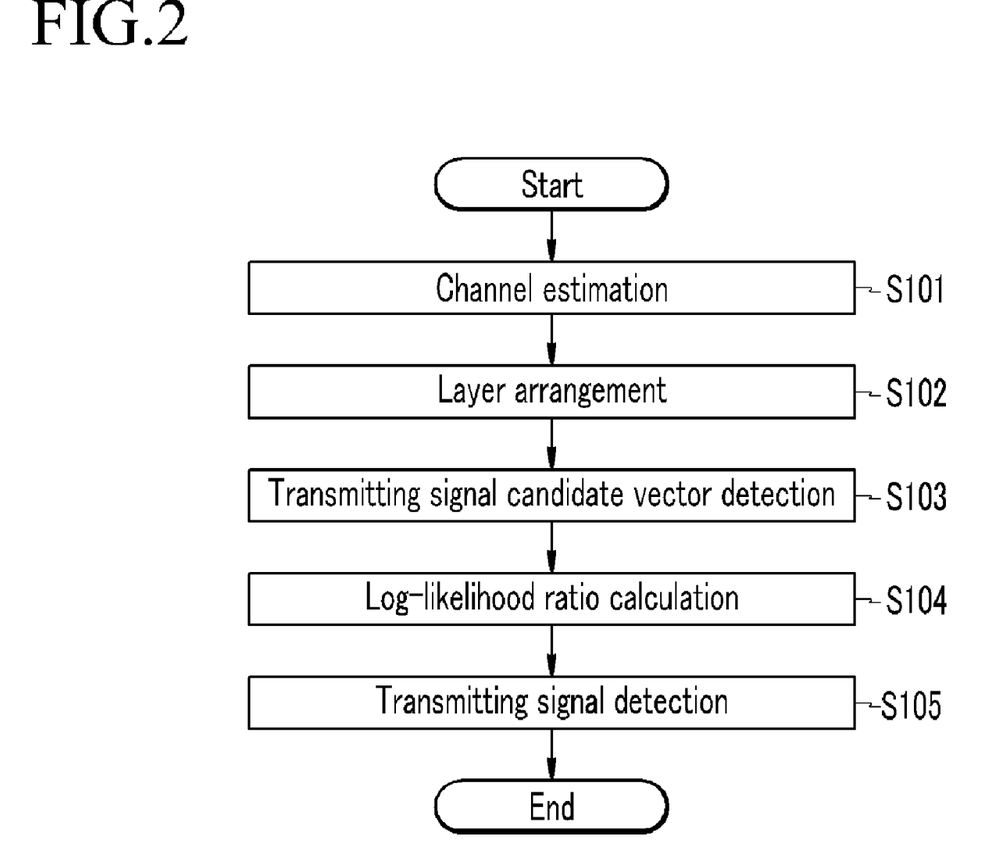
FIG. 2 is a flowchart showing a method of detecting a transmit signal of a receiver according to an exemplary embodiment of the present invention.
Figure 3:
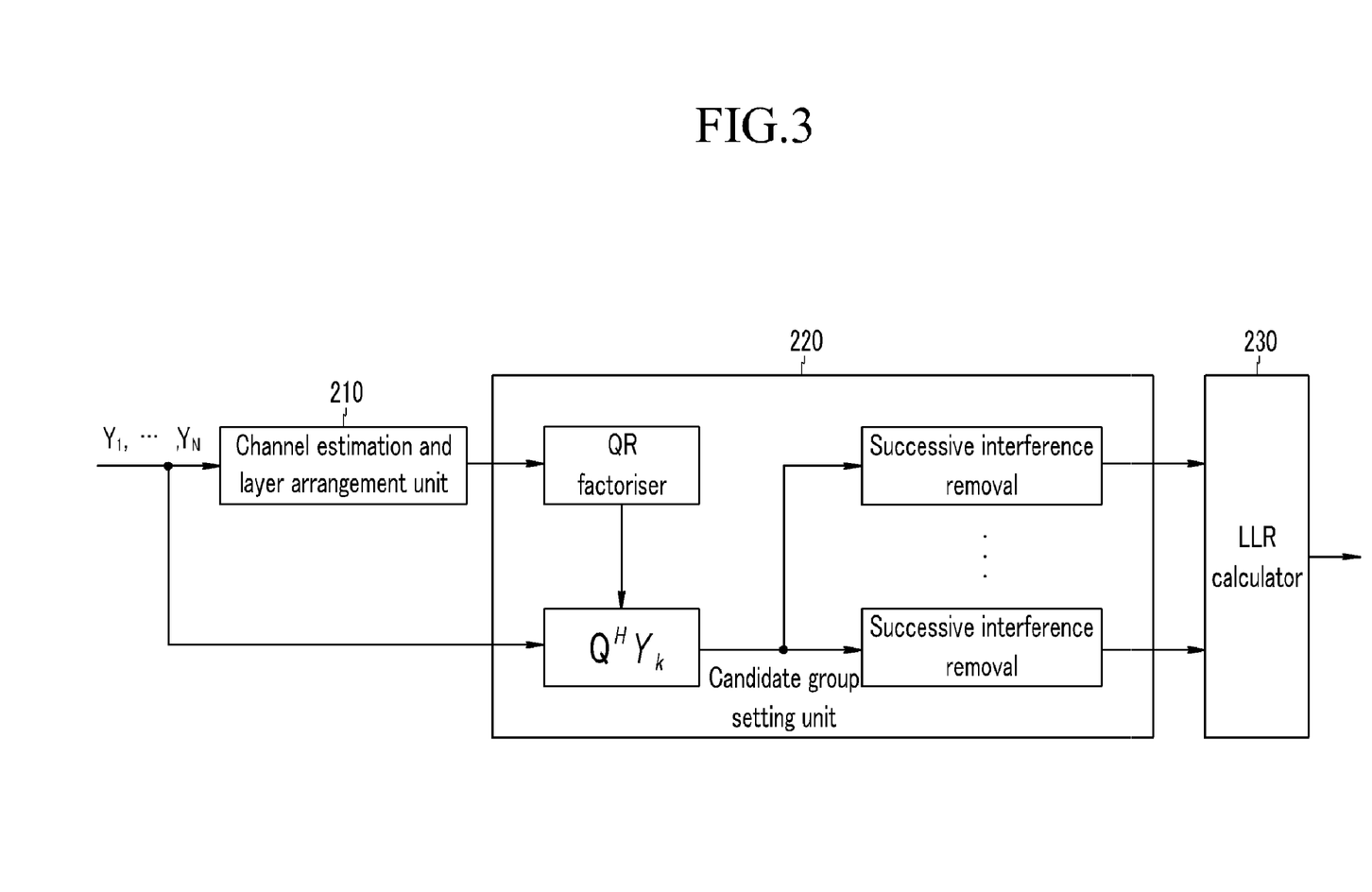
FIG. 3 is a configuration diagram showing a candidate group setting unit according to an exemplary embodiment of the present invention.
Figure 4:
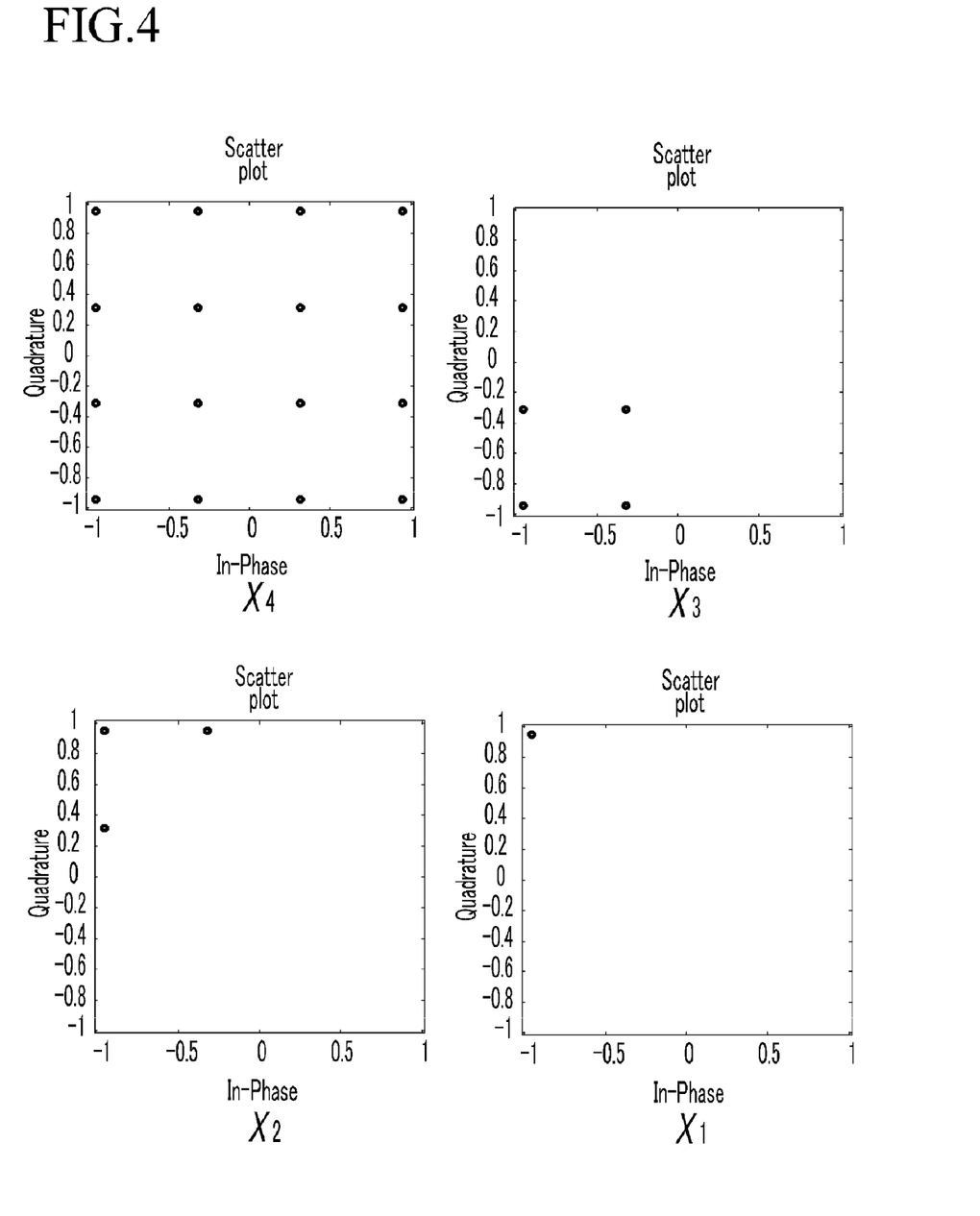
FIG. 4 is a diagram showing an example of a constellation according to an exemplary embodiment of the present invention.
Figure 5:
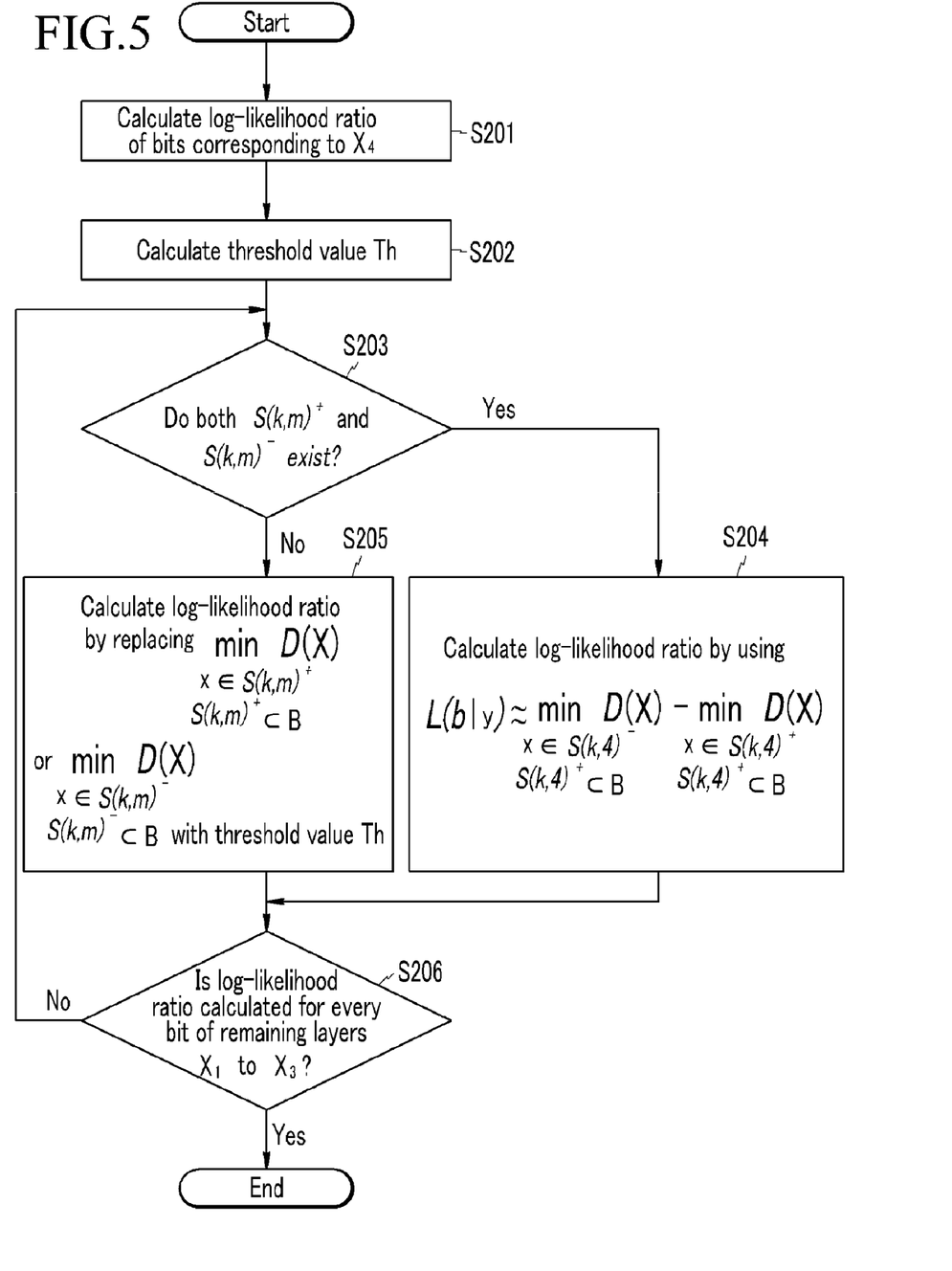
FIG. 5 is a flowchart showing a log-likelihood ratio calculation method according to an exemplary embodiment of the present invention.

FIG. 2 is a flowchart showing a method of detecting a transmit signal of the receiver 200 according to an exemplary embodiment of the present invention, and FIG. 3 is a detailed configuration diagram showing the candidate group setting unit 220 according to an exemplary embodiment of the present invention. Further, FIG. 4 is a diagram showing an example of a constellation according to an exemplary embodiment of the present invention, and FIG. 5 is a flowchart showing a log-likelihood calculation method ratio according to an exemplary embodiment of the present invention.

Referring to FIG. 2, when a signal is received through an antenna of the receiver 200, the channel estimation and layer arrangement unit 210 estimates a channel matrix $\tilde{H}$ using the received signal (S101), and calculates an inverse matrix G of the channel matrix that is estimated as Equation 1 in order to rearrange the layers.

$$G=\tilde{H}^{-1} \tag{Equation 1}$$

When the inverse matrix G of the estimated channel matrix $\tilde{H}$ is calculated, the channel estimation and layer arrangement unit 210 calculates a norm of each row of the inverse matrix G and rearranges the layers in the order of the norm of each row. Further, the channel matrix is rearranged according to the order of rearranged layers (S102). Specifically, a layer $x_4$ that corresponds to a row having the largest norm among the rows of the matrix G is positioned as the last layer, a layer $x_3$ that corresponds to a row having the smallest norm is positioned as a third layer, and the remaining layers $x_2$ and $x_1$ are sequentially arranged from a layer having a smaller norm. Further, a row of an estimated channel matrix ($\tilde{H}$) that corresponds to a row having the largest norm among rows of the inverse matrix G is allocated to the last row $h_4$ of the rearranged channel matrix H, a row of the estimated channel matrix $\tilde{H}$ that corresponds to a row having the smallest norm is allocated to a third row $h_3$ of the rearranged channel matrix H, and then the remaining rows of the channel matrix $\tilde{H}$ are allocated to the rearranged channel matrix H in the order of row of inverse matrix G having a smaller norm. The system model after rearrangement is represented by Equation 2.

$$\tilde{y}=Hx+\tilde{n} \tag{Equation 2}$$

Here, $\tilde{y}=[\tilde{y}_1\ \tilde{y}_2\ \tilde{y}_3\ \tilde{y}_4]^T$ refers to received signals $x=[x_1\ x_2\ x_3\ x_4]^T$ refers to rearranged transmitted signals (layers), $\tilde{n}=[\tilde{n}_1\ \tilde{n}_2\ \tilde{n}_3\ \tilde{n}_4]^T$ refers to noise signals, and $H=[h_1\ h_2\ h_3\ h_4]^T$ refers to the rearranged channel matrix. Further, $x_4$ has the smallest SNR and is a layer having lowest reliability, $x_3$ has the largest SNR and is a layer having the highest reliability, $x_2$ is a layer having the second SNR, and $x_1$ is a layer having the third SNR. The channel estimation and layer arrangement unit 210 rearranges the layers in order to consider all constellation dots for the layer ($x_4$) having the lowest reliability when the candidate group setting unit 220 detects the transmitting symbol candidate vector.

As described above, the channel matrix H and the layers $x=[x_1\ x_2\ x_3\ x_4]^T$ that are rearranged by the channel estimation and layer arrangement unit 210 are input to the candidate group setting unit 220. Thereafter, the candidate group setting unit 220 QR-factorizes the rearranged channel matrix H, applies Hermitian matrix $Q^H$ of an orthogonal matrix Q that is obtained by the QR factorization to the received signal $\tilde{y}=[\tilde{y}_1 \tilde{y}_2 \tilde{y}_3 \tilde{y}_4]^T$, and removes the successive interferences to detect the transmitting symbol candidate vector (S103). FIG. 3 shows every step of the operation of the candidate group setting unit 220 in detail.

The operation of the candidate group setting unit 220 will be described in detail. First, the candidate group setting unit 220 QR factorizes the channel matrix H that is rearranged by a QR factorizer as represented in Equation 3 in order to detect the transmitting symbol candidate vector.

$$H = QR$$
$$= Q \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix}$$
(Equation 3)

Here, Q refers to an orthogonal matrix, and R refers to an upper triangular matrix that includes diagonal components and has upper parts whose values are not zero.

Meanwhile, the candidate group setting unit 220 applies the Hermitian matrix $Q^H$ of the orthogonal matrix Q to the received signal $\tilde{y}=[\tilde{y}_1 \tilde{y}_2 \tilde{y}_3 \tilde{y}_4]^T$ obtained by Equation 3 to generate a signal y represented by Equation 4.

$$y=Q^H \tilde{y}$$
(Equation 4)

Further, the candidate group setting unit 220 considers all the constellation dots for the layer $x_4$ having the lowest reliability due to the smallest SNR. Furthermore, the candidate group setting unit 220 removes the successive interference signal using characteristics of the upper triangular matrix R that is detected by the QR factorization to detect the transmitting symbol candidate vector for the remaining layers $x_1$, $x_2$, $x_3$ (S103).

Specifically, one of a plurality of constellation dots is set as a layer $x_4$ having the smallest SNR, and a layer $x_3$ having the largest SNR is represented by Equation 5, with respect to the layer $x_4$ having the smallest SNR. Here, the slicing refers to an operation that maps to the closest constellation dot.

$$x_3 = \text{slicing}\left(\frac{y_3 - r_{34}x_4}{r_{33}}\right)$$
(Equation 5)

Then, the layer $x_2$ having the higher SNR next to the SNR of a layer $x_3$ having the highest SNR is represented by Equation 6, and the layer $x_1$ having the third SNR is represented by Equation 7.

$$x_2 = \text{slicing}\left(\frac{y_2 - r_{23}x_3 - r_{24}x_4}{r_{22}}\right)$$
(Equation 6)

$$x_1 = \text{slicing}\left(\frac{y_1 - r_{12}x_2 - r_{13}x_3 - r_{14}x_4}{r_{11}}\right)$$
(Equation 7)

As described above, when the slicing is applied to all the constellation dots for the layer $x_4$ having the lowest reliability due to the smallest SNR, it is possible to obtain as many transmitting symbol candidate vectors as the number C of the constellation dots. The group B of C transmitting symbol candidate vectors is defined by Equation 8.

$$B=\{\hat{x}(l)\}, 1 \leq l \leq C$$
(Equation 8)

Here, l is an integer between 1 and C.

The operational algorithm is more specifically shown in Table 1.

TABLE 1 candidate group setting algorithm for l = 1 : C $x_4 = \Omega(l)$ $x_3 = \text{slicing}\left(\frac{y_3 - r_{34}x_4}{r_{33}}\right)$ $x_2 = \text{slicing}\left(\frac{y_2 - r_{23}x_3 - r_{24}x_4}{r_{22}}\right)$ $x_1 = \text{slicing}\left(\frac{y_1 - r_{12}x_2 - r_{13}x_3 - r_{14}x_4}{r_{11}}\right)$ $\hat{x}(l) = \begin{bmatrix} x_1 \\ x_2 \\ x_3 \\ x_4 \end{bmatrix}$ end $B \equiv \{\hat{x}(l)\}, 1 \leq l \leq C$ That is, as shown in Table 1, after setting the layer $x_4$ having the smallest SNR using one constellation dot, the slicing is applied to the layer $x_4$ to calculate the remaining layers, and then the transmitting symbol candidate vector is calculated using the calculated layers. This operation is repeated for every constellation dot. In Table 1, C refers to the number of constellation dots.

Referring to FIG. 2 again, according to the exemplary embodiment of the present invention, in order to obtain a larger coding gain at the time of decoding the channel, bits of the transmitting signals, that is, the soft values for respective bits of the plurality of layers, are used. In other words, soft decision is performed using the soft value corresponding to each bit of the plurality of layers to detect the transmitting signals. Here, each soft value is a log-likelihood ratio.

Accordingly, the LLR calculator 230 calculates the log-likelihood ratio corresponding to each bit of the transmitting symbols in order to decode the channels (S104).

$b_{k,m}$ is defined as a k-th bit of an m-th transmitting symbol, and the following Equation 9 represents the log-likelihood ratio of the corresponding bit $b_{k,m}$.

$$L(b_{k,m} \mid y) = \min_{x \in S(k,m)^-} D(x) - \min_{x \in S(k,m)^+} D(x)$$
(Equation 9)

Here, D(x) refers to a Euclidean distance with respect to the transmitting symbol candidate vector of each bit $b_{k,m}$ of the transmitting signals, and is defined as $D(x)=\|y-Rx\|$ in the exemplary embodiment of the present invention. Further, S(k, m)⁺ refers to a transmitting symbol vector group that corresponds to a bit having a value of +1 ($b_{k,m}$=+1) among the transmitting symbol candidate vectors corresponding to the bits ($b_{k,m}$) of the transmitting signals, and S(k,m)⁻ refers to a symbol vector group that corresponds to a bit having a value of −1 ($b_{k,m}$=−1) among the transmitting symbol candidate vectors corresponding to the bits ($b_{k,m}$) of the transmitting signals. Equation 9 may be represented as Equation 10.

$$L(b_{k,m} \mid y) = \left(-\min_{x \in S(k,m)^+} D(x)\right) - \left(-\min_{x \in S(k,m)^-} D(x)\right) \quad \text{(Equation 10)}$$

The first right term of Equation 10 represents a likelihood function corresponding to a candidate ($b_{k,m}=+1$) having a value of +1 among the transmitting symbol candidate vectors of bits ($b_{k,m}$) of the transmitting signals, and the second term represents a likelihood function corresponding to a candidate ($b_{k,m}=-1$) having a value of −1 among the transmitting symbol candidate vectors of bits ($b_{k,m}$) of the transmitting signals. In the meantime, as described above, with respect to a bit of a transmitting signal in which both $S(k,m)^+$ and $S(k,m)^-$ simultaneously exist, the log-likelihood ratio is calculated using Equation 9. However, when only one of $S(k,m)^+$ and $S(k,m)^-$ exists, the log-likelihood ratio cannot be calculated using Equation 9.

Referring to FIG. 4, the layer $x_4$ having the lowest reliability includes all constellation dots. Therefore, the log-likelihood ratio for all bits that are included in the layer $x_4$ having the lowest reliability can be calculated using Equation 9. However, in the case of the bits that are included in the remaining layers $x_1$ to $x_3$, $S(k,m)^+$ or $S(k,m)^-$ may not exist. Therefore, the log-likelihood ratio may not be calculated using Equation 9.

Therefore, when $S(k,m)^+$ or $S(k,m)^-$ does not exist, in order to calculate $$\min_{\substack{x \in S(k,m)^+ \\ S(k,m)^+ \subset B}} D(x) \text{ or } \min_{\substack{x \in S(k,m)^- \\ S(k,m)^- \subset B}} D(x),$$

another log-likelihood ratio calculation method is required.

FIG. 5 is a flowchart showing a log-likelihood ratio calculation method using a receiver 200 according to an exemplary embodiment of the present invention. In the exemplary embodiment of the present invention, 16-QAM (quadrature amplitude modulation) is exemplified as a modulation method, but this invention is not limited thereto, and another modulation method can be applied.

Referring to FIG. 5, the LLR calculator 230 calculates the log-likelihood ratio for a layer $x_4$ having the lowest reliability in which $S(k,m)^+$ or $S(k,m)^-$ always exists (S201). That is, in the bits that correspond to the layer $x_4$ having the lowest reliability, $S(k,m)^+$ or $S(k,m)^-$ always exists. Therefore, the log-likelihood ratio is calculated using Equation 11.

$$L(b_{k,4} \mid y) \approx \min_{\substack{x \in S(k,4)^- \\ S(k,4)^- \subset B}} D(x) - \min_{\substack{x \in S(k,4)^+ \\ S(k,4)^+ \subset B}} D(x) \quad \text{(Equation 11)}$$

In this case, the LLR calculator 230 calculates a threshold value Th using Equations 12 to 15 in order to calculate a log-likelihood ratio for each bit of layers $x_1$ to $x_3$ other than the layer $x_4$ having the lowest reliability when $S(k,m)^+$ or $S(k,m)^-$ does not exist (S202).

$$T^+(k) = \min_{\substack{x \in S(k,4)^+ \\ S(k,4)^+ \subset B}} D(x), \quad 1 \leq k \leq 4 \quad \text{(Equation 12)}$$

$$T^-(k) = \min_{\substack{x \in S(k,4)^- \\ S(k,4)^- \subset B}} D(x), \quad 1 \leq k \leq 4 \quad \text{(Equation 13)}$$

$$T(k) = \max(T^+(k), T^-(k)), \quad 1 \leq k \leq 4 \quad \text{(Equation 14)}$$

$$Th = \frac{\sum_{k=1}^{4} T(k)}{4} \quad \text{(Equation 15)}$$

Equation 12 is an expression that calculates the minimum Euclidean distance ($T^+(k)$) of candidates having a value of +1 among the transmitting symbol candidate vectors for a layer $x_4$ having the lowest reliability, and Equation 13 is an expression that calculates the minimum Euclidean distance ($T^+(k)$) of candidates having a value of −1 among the transmitting symbol candidate vectors for a layer $x_4$ having the lowest reliability. Further, Equation 14 is an expression that calculates the maximum value between the minimum Euclidean distances ($T^+(k)$) of candidates having a value of +1 and candidates having a value of −1 among the transmitting symbol candidate vectors for a layer $x_4$ having the lowest reliability. Equation 15 is an expression that calculates the average of the maximum values calculated as described above, and the value calculated through Equation 15 becomes a threshold value Th.

The LLR calculator 230 calculates the log-likelihood ratio for bits corresponding to the remaining layers $x_1$ to $x_3$ using the threshold value Th calculated as described above when $S(k,m)^+$ or $S(k,m)^-$ does not exist. That is, after confirming whether both $S(k,m)^+$ and $S(k,m)^-$ exist for the bits corresponding to the remaining layers ($x_1$ to $x_3$) (S203), if both $S(k,m)^+$ and $S(k,m)^-$ exist, the log-likelihood ratio is calculated using Equation 11 (S204). Further, if one of $S(k,m)^+$ and $S(k,m)^-$ does not exist, instead of $$\min_{\substack{x \in S(k,m)^+ \\ S(k,m)^+ \subset B}} D(x) \text{ or } \min_{\substack{x \in S(k,m)^- \\ S(k,m)^- \subset B}} D(x),$$

the threshold value Th is used to calculate the log-likelihood ratio (S205) as represented in Equation 16.

$$\min_{\substack{x \in S(k,m)^| \\ S(k,m)^+ \subset B}} D(x) = Th \text{ or } \min_{\substack{x \in S(k,m) \\ S(k,m)^- \subset B}} D(x) = Th \quad \text{(Equation 16)}$$

Meanwhile, in Equation 15, an averaging method in which the average of the minimum Euclidian distances is used as the threshold value Th is used to produce the log-likelihood ratio. However, in this embodiment, a maximum of multiple minimum Euclidian distances can be used as the threshold value Th to calculate the log-likelihood ratio. In this case, Equation 15 is substituted by the following Equation 17.

$$Th = \max_{1 \leq k \leq 4}(T^-(k), T^-(k)) \quad \text{(Equation 17)}$$

This log-likelihood ratio calculation algorithm is shown in Table 2 and Table 3 in detail. Table 2 shows an averaging method, and Table 3 shows the maximum of multiple minimums.

TABLE 2

Averaging method

| | Operation | Related equation |
|---|---|---|
| Step 1 | Calculate log-likelihood ratio for bits corresponding to layer $x_4$ having the lowest reliability | Equation 11 |
| Step 2 | During step 1, calculate threshold value Th using the averaging method | Equation 12 Equation 13 Equation 14 Equation 15 |
| Step 3 | Log-likelihood ratio for the bits corresponding to the remaining layers ($x_1$ to $x_3$) is calculated (if $S(k,m)^+$ or $S(k,m)^-$ does not exist, use Th obtained in Step 2 to calculate $\min_{x \in S(k,m)^+} D(x)$ or $\min_{x \in S(k,m)^-} D(x))$ $S(k,m)^+ \subset B$  $S(k,m)^- \subset B$ | Equation 16 |

TABLE 3

Maximum of multiple minimums

| | Operation | Related equation |
|---|---|---|
| Step 1 | Calculate log-likelihood ratio for bits corresponding to layer $x_4$ having the lowest reliability | Equation 11 |
| Step 2 | During Step 1, calculate threshold value Th using maximum of multiple minimums | Equation 12 Equation 13 Equation 17 |
| Step 3 | Log-likelihood ratio for the bits corresponding to the remaining layers ($x_1$ to $x_3$) is calculated (if $S(k,m)^+$ or $S(k,m)^-$ does not exist, use Th obtained in Step 2 to calculate $\min_{x \in S(k,m)^+} D(x)$ or $\min_{x \in S(k,m)^-} D(x))$ $S(k,m)^+ \subset B$  $S(k,m)^- \subset B$ | Equation 16 |

The LLR calculator 230 repeats the log-likelihood ratio calculating steps (S203 to S205) until log-likelihood ratios for all bits corresponding to the remaining layers $x_1$ to $x_3$ are calculated (S206).

Referring to FIG. 2, when the LLR calculator 230 calculates the log-likelihood ratios for bits corresponding to all layers $x_1$ to $x_4$ to output them, the multiplexer 240 and the signal processor 250 decode the channel using the log-likelihood ratios (S105), and finally detect the transmitting signal.

Figure 6:
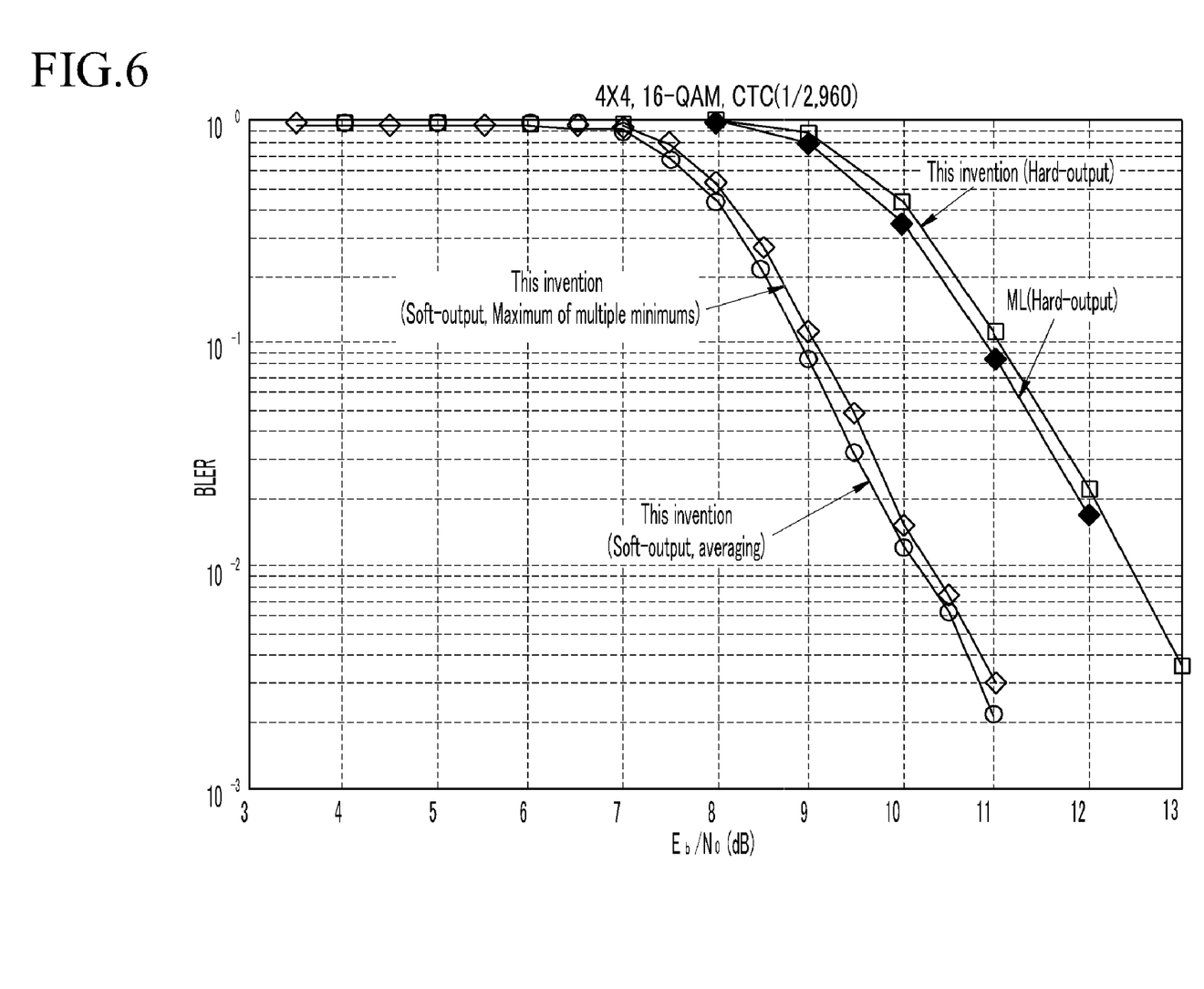
FIG. 6 shows an example of a block error rate when a transmitting signal is detected using a receiver according to an exemplary embodiment of the present invention.

FIG. 6 shows an example of a block error rate when the transmitting signal is detected using a receiver 200 according to an exemplary embodiment of the present invention in which four transmitting and receiving antennas, 16-QAM modulation, ½ code rate, and convolutional turbo code (CTC) are used.

Referring to FIG. 6, the size of information bits for creating one block, that is, one code word, is 960. In FIG. 6, the hard output performance of a signal receiving method according to an exemplary embodiment of the present invention is close to the performance of the maximum likelihood. Further, the soft output performance obtains a gain of 2 dB as compared with the hard output performance.

That is, the receiver 200 according to the exemplary embodiment of the present invention has low complexity and good transmitting signal detection performance.

According to the present invention, a receiver detects a transmitting signal using a log-likelihood ratio calculation method with low complexity and good performance in a MIMO system that uses a spatial multiplexing method.

The exemplary embodiment of the present invention that has been described above may be implemented by not only an apparatus and a method but also a program capable of realizing a function corresponding to the structure according to the exemplary embodiment of the present invention and a recording medium having the program recorded therein. It can be understood by those skilled in the art that the implementation can be easily made from the above-described exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A log-likelihood ratio calculation method of a receiver, comprising:
rearranging a plurality of layers;
detecting a transmitting symbol candidate vector using the plurality of rearranged layers;
calculating a log-likelihood ratio of a first layer among the plurality of layers and a threshold value using the transmitting symbol candidate vector; and
calculating a log-likelihood ratio of at least one second layer other than the first layer among the plurality of layers using the transmitting symbol candidate vector and the threshold value.

2. The method of claim 1, wherein the rearranging of a plurality of layers comprises:
estimating a channel matrix using a received signal;
calculating an inverse matrix of the channel matrix; and
rearranging the plurality of layers on the basis of the norms of rows of the inverse matrix.

3. The method of claim 2, wherein the rearranging of a plurality of layers comprises:
arranging the first layer corresponding to a row of the inverse matrix that has the largest norm at the last row of a transmitting signal; and
arranging the at least one second layer before the last row of the transmitting signal.

4. The method of claim 2, wherein the detecting of a transmitting symbol candidate vector comprises:
rearranging the channel matrix according to the to the norms of rows of the inverse matrix; and
factorizing the rearranged channel matrix into an orthogonal matrix and an upper triangular matrix;
assigning the first layer to a plurality of constellation dots;
detecting a symbol corresponding to the at least one second layer by removing successive interferences of the plurality of constellation dots that are assigned to the first layer using characteristic of the upper triangular matrix; and
setting the transmitting symbol candidate vector on the basis of the symbols of the first layer that are assigned to the plurality of constellation dots and the at least one second layer.

5. The method of claim 4, wherein the calculating of a threshold value comprises:
calculating a first minimum Euclidean distance of candidates having a value of +1 among the transmitting symbol candidate vectors for every bit of the first layer;

calculating a second minimum Euclidean distance of candidates having a value of −1 among the transmitting symbol candidate vectors for every bit of the first layer;

calculating the maximum value between the first minimum Euclidean distance and the second Euclidean distance for every bit of the first layer; and setting an average of the maximum values of the bits of the first layer as the threshold value.

6. The method of claim 4, wherein the calculating of a threshold value comprises:

calculating a first minimum Euclidean distance of candidates having a value of +1 among the transmitting symbol candidate vectors for every bit of the first layer;

calculating a second minimum Euclidean distance of candidates having a value of −1 among the transmitting symbol candidate vectors for every bit of the first layer; and setting the maximum value between the first minimum Euclidean distance and the second Euclidean distance for every bit of the first layer as the threshold value.

7. The method of claim 1, wherein the calculating of a log-likelihood ratio of at least one second layer comprises:

detecting a bit having a candidate having a value of 1 among the bits of the at least one second layer;

calculating a minimum Euclidean distance for the detected bit; and calculating a log-likelihood ratio for the detected bit using the minimum Euclidean distance and the threshold value.

8. The method of claim 1, wherein the calculating of a log-likelihood ratio of at least one second layer comprises:

detecting a bit having a candidate having a value of −1 among the bits of the at least one second layer;

calculating a minimum Euclidean distance for the detected bit; and calculating a log-likelihood ratio for the detected bit using the minimum Euclidean distance and the threshold value.

9. The method of claim 1, wherein the calculating of a log-likelihood ratio of at least one second layer comprises:

detecting a bit having both a candidate having a value of −1 and a candidate having a value of 1 among the bits of the at least one second layer;

calculating a first minimum Euclidean distance for the candidate having a value of −1 and a second minimum Euclidean distance for the candidate having a value of 1; and calculating a log-likelihood ratio for the detected bit using the first minimum Euclidean distance and the second minimum Euclidean distance.

10. A transmitting signal detection method of a receiver, comprising:

estimating a channel matrix;

rearranging a plurality of layers on the basis of the norms of rows of an inverse matrix of the channel matrix;

detecting a transmitting symbol candidate vector using the plurality of rearranged layers;

calculating a first log-likelihood ratio of a layer having the lowest reliability among the plurality of layers and a threshold value using the transmitting symbol candidate vector;

calculating a second log-likelihood ratio of the remaining layers other than the layer having the lowest reliability among the plurality of layers using the transmitting symbol candidate vector and the threshold value; and detecting a transmitting signal on the basis of the first log-likelihood ratio and the second log-likelihood ratio.

11. The method of claim 10, wherein the rearranging of a plurality of layers comprises:

arranging a layer having the lowest reliability corresponding to a row of the inverse matrix that has the largest norm at the last row of the transmitting signal; and sequentially arranging the remaining layers in the order of the norm of the row of the inverse matrix at the remaining rows other than the last row.

12. The method of claim 10, wherein the calculating of a threshold value comprises:

calculating a first minimum Euclidean distance of a candidate having a value of +1 among the transmitting symbol candidate vectors corresponding to a layer having the lowest reliability;

calculating a second minimum Euclidean distance of a candidate having a value of −1 among the transmitting symbol candidate vectors corresponding to a layer having the lowest reliability;

selecting one of the first minimum Euclidean distance and the second minimum Euclidean distance; and calculating the threshold value using the selected minimum Euclidean distance.

13. The method of claim 12, wherein the calculating of the second log-likelihood ratio comprises:

detecting a bit having candidates having at least one of −1 and 1 among the bits of the remaining layers;

calculating a minimum Euclidean distance for the detected bit; and calculating the log-likelihood ratio for bits of the remaining layers using at least one of the minimum Euclidean distance and the threshold value.

14. A receiver comprising:

a channel estimation and layer arrangement unit that estimates a channel matrix and rearranges the channel matrix and a plurality of layers;

a candidate group setting unit that assigns a first layer among the plurality of layers to a plurality of constellation dots and sets a transmitting symbol candidate vector by removing successive interference of at least one second layer excepting the first layer among the plurality of layers; and a log-likelihood ratio calculator that calculates a first log-likelihood ratio corresponding to the first layer using a minimum Euclidean distance corresponding to the first layer and a threshold value, and a second log-likelihood ratio corresponding to the at least second layer using the threshold value.

* * * * *